United States Patent [19]

Musschoot

[11] E Re. 28,484

[45] Reissued July 15, 1975

[54] SUPPORT STRUCTURE FOR USE WITH VIBRATORY DEVICES

[75] Inventor: Albert Musschoot, Barrington, Ill.

[73] Assignee: General Kinematics Corporation, Barrington, Ill.

[22] Filed: Sept. 4, 1973

[21] Appl. No.: 394,329

Related U.S. Patent Documents

Reissue of:

[64] Patent No.: 3,706,372
Issued: Dec. 19, 1972
Appl. No.: 103,383
Filed: Jan. 4, 1971

[52] U.S. Cl. ..... 198/220 CA
[51] Int. Cl. ..... B65g 27/00
[58] Field of Search.....198/220 CA, 220 BB, 198/220 CC, 220 A; 209/326, 345, 365 B, 209/415; 248/399; 267/153, 154, 141

[56] References Cited

UNITED STATES PATENTS

| | | | |
|---|---|---|---|
| 2,212,550 | 8/1940 | Parks | 209/326 |
| 2,342,116 | 2/1944 | Broekhuysen | 198/220 BA |
| 3,468,418 | 9/1969 | Renner | 198/220 A |

FOREIGN PATENTS OR APPLICATIONS

| | | | |
|---|---|---|---|
| 1,043,940 | 11/1958 | Germany | 198/220 CA |

*Primary Examiner*—Evon C. Blunk
*Assistant Examiner*—Douglas D. Watts
*Attorney, Agent, or Firm*—Hofgren, Wegner, Allen, Stellman & McCord

[57] ABSTRACT

A vibratory device such as for use in conveying pulverulent materials and the like. The device includes a material-carrying member which is reciprocated by a suitable drive. The material-carrying member is carried on resilient supports to support the member substantially solely by resistance thereof to shear.

1 Claim, 2 Drawing Figures

Inventor:-
Albert Musschoot,
By Hofgren, Wegner, Allen, Stellman & McCord Attys

SUPPORT STRUCTURE FOR USE WITH VIBRATORY DEVICES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to vibratory devices and in particular to vibratory devices wherein a material-carrying member is vibrated to move material along a preselected path.

2. Description of the Prior Art

In one improved form of vibratory device shown in Musschoot et al. U.S. Pat. No. 3,335,861 for a Vibratory Device, owned by the assignee hereof, a vibrating conveyor is shown to include a trough supported on its underside by a plurality of coiled springs. In Musschoot et al. U.S. Pat. No. 3,134,483 for a Vibratory Device, owned by the assignee hereof, a conveyor trough is shown to be carried on a plurality of subjacent rubber blocks. Such conveyor devices impose substantial forces on the support elements subjecting them to substantial wear and requiring relatively frequent replacement. The disposition of the support means subjacent the troughs presents a serious problem in that maintenance is relatively difficult due to the relative inaccessibility of the support devices.

Such vibratory conveyors may be operated at or near the resonant frequencies of the support means. While improved efficiency in movement of materials along the trough is obtained, it has been found that such operation aggravates the maintenance problem by accelerated deterioration of the support means.

SUMMARY OF THE INVENTION

The present invention comprehends an improved means for mounting a vibratory device eliminating the disadvantages of the above discussed known support means in a novel and simple manner. The support means of the present invention are extremely simple and economical of construction while yet providing the highly desirable features discussed below.

More specifically, the present invention comprehends the provision in a vibratory device having a material-carrying member, a base, and means for imparting vibratory conveying movement to the member, of a plurality of support structures for resiliently supporting the material-carrying member, each support structure comprising first rigid support means on the base, second rigid support means on the material-carrying member having a portion spaced horizontally from the first support means, and a resilient support means extending between the first rigid support means and the second rigid support means for supporting the material-carrying member substantially solely by the resistance of the resilient support means to shear.

The resilient support means may comprise a resilient member such as a toroidal member held between substantially rigid support elements one of which is mounted to the base of the device and the other of which is movable with the trough. The resilient member may be frictionally clamped between the rigid support elements. Clamping plates may be provided for providing the frictional engagement.

The support member may comprise an annular member having a diameter substantially greater than the thickness thereof for providing improved shear resistance in supporting the conveyor trough.

The resilient supports may be mounted at the sides of the device thereby facilitating maintenance by virtue of the improved accessibility. The simplified construction of the support means further effectively minimizes maintenance requirements while yet providing an improved support of the trough.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
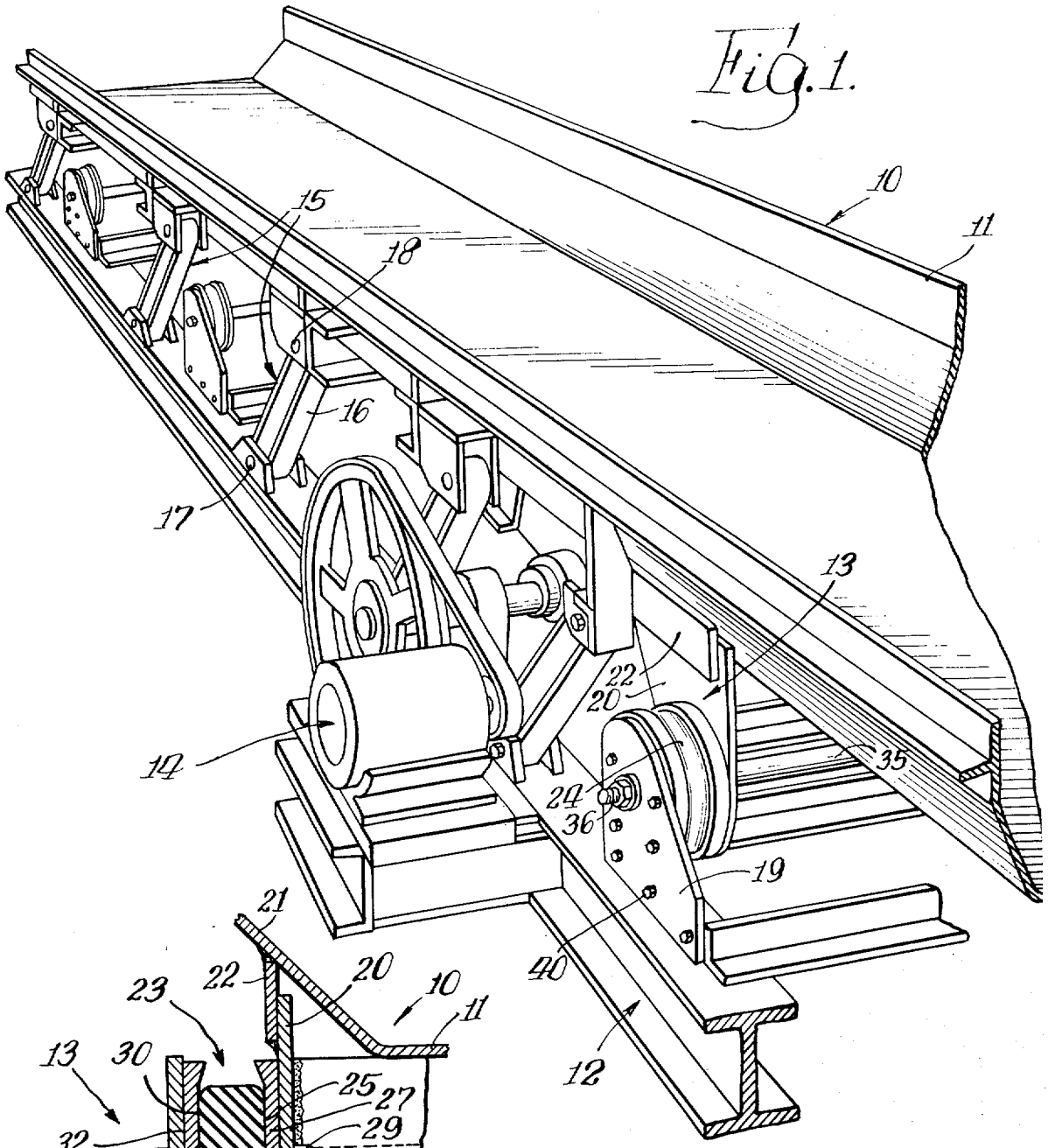
FIG. 1 is a fragmentary perspective view of a vibratory device provided with supporting means embodying the invention.

In the exemplary embodiment of the invention as shown in the drawing, a vibratory device generally designated 10 is shown to comprise a material-carrying member, or trough, 11 movably carried on a base generally designated 12 by support means generally designated 13. The trough is vibrated such as for moving material therealong by means of a vibratory drive generally designated 14 and a plurality of motion-constraining devices generally designated 15. Drive 14, motion-constraining devices 15, and support means 13 cooperate to cause trough 11 to vibrate suitably to move material such as pulverulent material along the trough in a predetermined path.

More specifically, drive 14 is arranged to cause reciprocation of the trough 11 generally longitudinally thereof. Motion-constraining devices 15 comprise arms 16 having one end swingably mounted to the base 12 by means of pivots 17 and upper ends connected to the trough by means of pivots 18. Thus, devices 15 cause the trough to reciprocate in a swinging fashion about the parallel axes of pivots 17 and 18 when driven by the drive 14. Support means 13 support the trough on base 12 while facilitating such swinging movement to provide high efficiency in the conveying action of the vibratory device.

Figure 2:
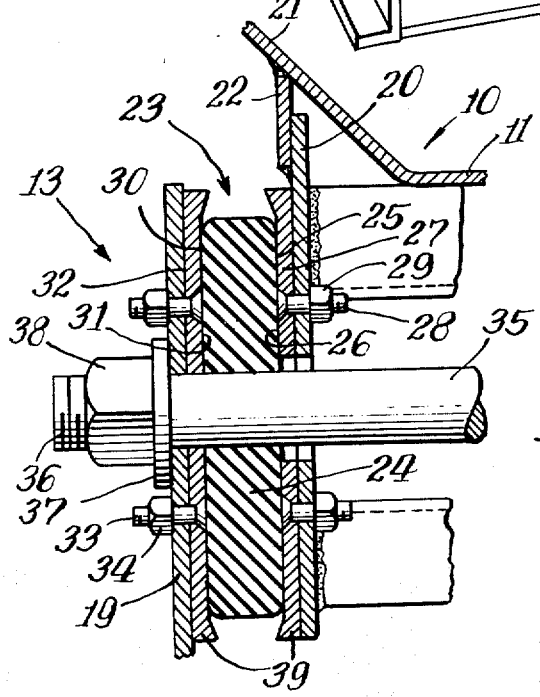
FIG. 2 is a fragmentary enlarged vertical section of the conveyor supporting means.

Referring now more specifically to FIG. 2, each support means 13 includes a mounting plate 19 secured to base 12. A cooperating mounting plate 20 is secured to the side portions 21 of trough 11 by means of a connecting bar 22. Plates 19 and 20 extend facially parallel to each other and are adjacently spaced to define a force transfer space 23 therebetween. A resilient support element generally designated 24 is disposed in space 23 for resiliently supporting the trough to the base.

More specifically, resilient support element 24 comprises an annular member formed of resilient material, such as rubber, having an inner face 25 frictionally engaging inner surface 26 of a friction plate 27 secured to mounting plate 20 by suitable means such as screws 28 and nuts 29. The outer surface 30 frictionally engages the inner surface 31 of a second friction plate 32 secured to mounting plate 19 by suitable means such as screws 33 and nuts 34.

The support devices 13 are provided in pairs at opposite sides of the conveyor with the annular support elements in coaxial alignment. A connecting rod 35 [extends to trough 11 and] includes outer threaded ends 36 projecting outwardly through the plates 19 to receive a suitable washer 37 and nut 38 for stabilizing the support means. Thus, rod 35 [locates] *clamps* resilient element 24 coaxially of friction plates 27 and 32. Further, the periphery of friction plates 27 and 32 may be provided with inwardly flared peripheral portions 39 which tend to [ further] maintain the resilient element 24 coaxially within space 23.

Removal and replacement of resilient elements 24 may be readily effected by removal of the nuts 38 from the threaded ends 36 of rod 35. Mounting plate 19 may be removably secured to base 12 as by means of screws 40 to permit the withdrawal of the mounting plates 19 together with friction plates 32 secured thereto, thus providing accessibility to space 23 for removal and replacement of the resilient element 24.

Thus, resilient elements 24 provide cushioned carrying of the trough 11 during the vibration thereof effected by the swinging movement of the trough controlled by the arm 16 and effected by the drive 14. When the drive is stopped, the resilient support elements 24 support the trough in a lowermost position by the resistance of the resilient elements 24 to shear in a downward direction. During vibratory driving of the trough, the shear forces are generated in substantially all directions parallel to the direction of swinging of the arm 16 and the toroidal configuration of the resilient member 24 provides for improved resilient carrying of the trough during such vibratory movement.

Thus, support means 13 are extremely simple and economical of construction while yet providing an improved resilient support of the vibratory devices and affording facilitated maintenance thereof when required.

The foregoing disclosure of specific embodiments is illustrative of the broad inventive concepts comprehended by the invention.

I claim:

[1. In a vibratory device having a material-carrying member, a base, and means for imparting vibratory conveying movement to said member, a plurality of support structures for resiliently supporting said material-carrying member, each support structure comprising: first rigid support means on said base; second rigid support means on said material-carrying member having a portion spaced horizontally from said first support means; a resilient support member between said first rigid support means and said second rigid support means for supporting said material-carrying member substantially solely by the resistance of said resilient support means to shear; and means for causing said support member to be clamped between said support means and preventing lateral translation of the support member relative to one of said support means comprising a rigid, elongated element fixedly carried by said one of said rigid support means extending snugly through said resilient support member and through the other of said support means, said other said support means having an opening substantially larger than the cross section of the portion of said elongated element extending therethrough to permit lateral movement of the elongated element relative to said other support means.]

[2. The vibratory device support structure of claim 1 wherein said resilient support member comprises a block of resilient material.]

[3. The vibratory device support structure of claim 1 wherein said resilient member comprises an element formed of resilient material and having opposite end faces frictionally engaging said rigid support means.]

[4. The vibratory device support structure of claim 1 wherein said resilient support member comprises an annular element of resilient material extending axially between said rigid support means.]

[5. The vibratory device support structure of claim 1 wherein said resilient support member comprises a block of resilient material having opposite faces frictionally engaging confronting surfaces of said rigid support means, the area of said faces being substantially less than the area of said confronting surfaces.]

[6. The vibratory device support structure of claim 1 wherein said resilient support member comprises a block of resilient material and said means for preventing lateral translation of the support member further defines means for compressively clamping said block between said rigid support means.]

[7. The vibratory device support structure of claim 1 wherein said resilient support member comprises a rubber annulus extending axially between said rigid support means.]

[8. The vibratory device support structure of claim 1 wherein a pair of said support structures are provided one each at opposite sides of said material-carrying member and a connecting rod extends therebetween.]

[9. The vibratory device support structure of claim 1 wherein the resilient support member comprises a resilient annular member and said first and second support means comprise coaxial discs having a diameter greater than the diameter of said annular member.]

*10. In a vibratory device having an elongated material-carrying member, a base, and means for imparting vibratory conveying movement to said member, a plurality of support structures for resiliently supporting said material-carrying member, each support structure comprising: a first pair of rigid support means secured to opposite sides of the base with each member of said pair having a vertically arranged flat face extending parallel to the direction of elongation of said material-carrying member, a second pair of rigid support means secured to opposite sides of said material-carrying member with each member of the second pair of rigid support means having a vertically arranged flat face extending parallel to the direction of elongation of said material-carrying member, each member of the first pair of rigid support means being located to have its face horizontally spaced from and opposing the face of a member of the second pair of rigid support means, an annular resilient rubber support member between each pair of opposing faces said rubber support member having a diameter greater than its thickness and means for clamping said rubber support member between said opposing faces including an elongated element carried by one of said pairs of support means and extending through openings in the other pair of support means and through the central openings in the rubber support members, the openings in said second pair of rigid support members being larger than the diameter of said elongated element to permit said material-carrying member to be supported by said rubber support members substantially solely by the resistance of such rubber support members to shear.*

* * * * *